US009824272B2

(12) United States Patent
Choi (10) Patent No.: US 9,824,272 B2
(45) Date of Patent: Nov. 21, 2017

(54) IRIS RECOGNITION CAMERA SYSTEM FOR MOBILE DEVICE

(71) Applicant: Kyung Yong Choi, Gyeonggi-do (KR)

(72) Inventor: Kyung Yong Choi, Gyeonggi-do (KR)

( * ) Notice: Subject to any disclaimer, the term of this patent is extended or adjusted under 35 U.S.C. 154(b) by 352 days.

(21) Appl. No.: 14/389,580

(22) PCT Filed: Mar. 20, 2013

(86) PCT No.: PCT/KR2013/002272
§ 371 (c)(1),
(2) Date: Sep. 30, 2014

(87) PCT Pub. No.: WO2013/154273
PCT Pub. Date: Oct. 17, 2013

(65) Prior Publication Data
US 2015/0062324 A1    Mar. 5, 2015

(30) Foreign Application Priority Data

Apr. 13, 2012 (KR) .................. 10-2012-0038537

(51) Int. Cl.
*H04N 7/18* (2006.01)
*G06K 9/00* (2006.01)
(Continued)

(52) U.S. Cl.
CPC ......... *G06K 9/00604* (2013.01); *G06K 9/209* (2013.01); *G06K 9/2018* (2013.01); *G06K 9/228* (2013.01); *H04N 5/2256* (2013.01); *H04N 5/23219* (2013.01); *H04N 5/33* (2013.01); *H04N 7/18* (2013.01)

(58) Field of Classification Search
CPC .. G06K 9/00606; G06K 9/2018; G06K 9/209; G06K 9/228; H04N 5/2256; H04N 5/23219; H04N 5/33; H04N 7/18
See application file for complete search history.

(56) References Cited

U.S. PATENT DOCUMENTS 7,675,016 B2 * 3/2010 Mochizuki ........ H01L 27/14618
250/208.1
8,519,426 B2 * 8/2013 Lee ..................... H01L 33/486
257/100
(Continued)

FOREIGN PATENT DOCUMENTS

KR    10-2009-0106790    10/2009
KR    10-2009-0120271    11/2009
(Continued)

*Primary Examiner* — Nhon Diep
(74) *Attorney, Agent, or Firm* — Norris McLaughlin & Marcus, P.A.

(57) ABSTRACT

An iris recognition camera system for mobile device includes a sensor and associated circuit, a lens and lighting sources including a lighting source element, a displaying light source element and IR LED light source elements, wherein the lighting sources are installed around the center of a camera lens with a certain clearance, and the lighting sources are attached on an FPCB and arranged on the four sides of the center of the camera lens and equipped with an FPCB cover for protection and a guiding mirror so that a user may conveniently acquire an image of his or her iris watching the image of his or her iris so as to identify and process only a living iris.

7 Claims, 4 Drawing Sheets

(51) Int. Cl.
*G06K 9/20* (2006.01)
*G06K 9/22* (2006.01)
*H04N 5/33* (2006.01)
*H04N 5/225* (2006.01)
*H04N 5/232* (2006.01)

(56) References Cited

U.S. PATENT DOCUMENTS

| | | | |
|---|---|---|---|
| 8,928,753 B2 * | 1/2015 | Han | B60R 1/00 |
| | | | 348/148 |
| 9,056,630 B2 * | 6/2015 | Han | B62D 15/029 |
| 9,117,119 B2 * | 8/2015 | Hanna | G06K 9/00221 |
| 2013/0135513 A1 | 5/2013 | Choi et al. | |
| 2013/0328094 A1 * | 12/2013 | Lee | H01L 33/486 |
| | | | 257/98 |

FOREIGN PATENT DOCUMENTS

| | | |
|---|---|---|
| KR | 10-2010-0087832 | 8/2010 |
| KR | 10-1046770 | 7/2011 |
| KR | 10-2012-0020024 | 3/2012 |

* cited by examiner

IRIS RECOGNITION CAMERA SYSTEM FOR MOBILE DEVICE

BACKGROUND OF THE INVENTION

The present invention relates to an iris recognition camera system for mobile devices which alloys a brightness and range of lighting and a direction of irradiation to be designed as desired by being equipped with an FPCB (flexible printed circuit board) on which an IR LED (infrared light-emitting diode) light source element is attached and with an FPCB cover (guide) either side of which has a concave-convex portion to scatter light or an FPCB cover of which materials contain a substance that scatters or diffuses light or of which surface is coated with such a substance, and also relates to an iris recognition system which is designed to effectively adjust the size of a camera by installing multiple (at least four) IR LED light source elements, which are aligned around a camera, on an FPCB, to ameliorate user convenience by visually displaying that iris recognition is being performed and to minimize the size and volume of a camera by employing an elliptical mirror optimized for iris-guiding.

Authenticated certificates are being widely used in almost all fields of electronic commerce including internet shopping, online banking, mobile stock trading, Internet issuance of public documents, etc.

Such authenticated certificates are online forms of identification that are necessary to validate a person's identity so as to allow him or her to conduct convenient internet transactions, but they are vulnerable in terms of security because the certificate files and passwords may be leaked out through hacking.

Since conventional methods for identity validation have such a problem, schemes using biological information are being pursued. In this regard, biometric technology has attracted attention as user authentication technology that provides convenience and safety, being selected as one of the "10 promising technologies for the $21^{st}$ century" by MIT, Gartner Group, etc.

Iris recognition is regarded as the most secure among currently implemented biometric technologies in that the probability of one human iris having the same pattern as another is approximately one in six billions, which is supported by the fact that it is currently used as identification means in many countries including US, Japan, UK and Germany.

In general, an IR (infrared) LED light source element is used for iris recognition while the radiation angle (lighting angle) of the IR LED light source element is determined to be twice the angle that corresponds to a half of the peak relative illumination.

Figure 7:
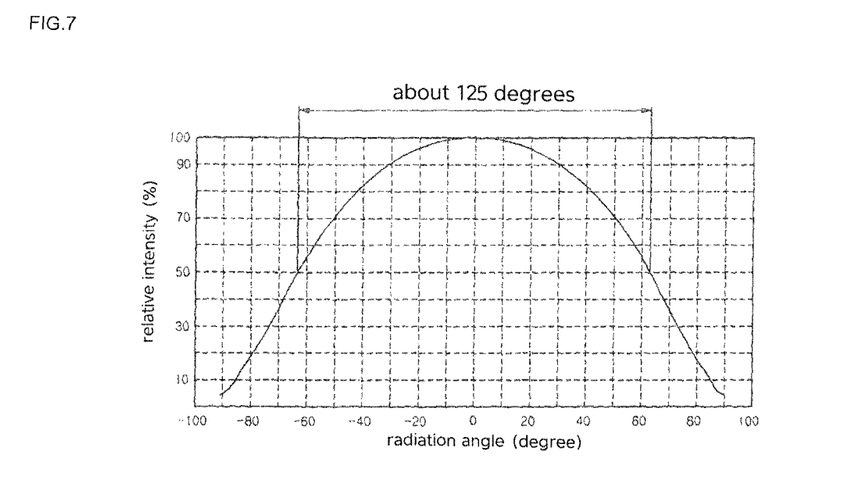
FIG. 7 shows an example of a diagram that plots the radiation angle of an IR LED.

An example of such a radiation angle is as illustrated in FIG. 7, in which the radiation angle (lighting angle) is about 125 degrees.

An iris recognition camera lens has a specific field of vision, or field of view, which is represented in a unit of angle, and an image within its angular range may be formed on a sensor.

The field of vision of a lens may have a variety of combinations depending on the distance between the lens and the iris, the resolution (or the number of pixels) of an image sensor, the performance of a device that validates an identity based on an iris image and the structure of a program to process it.

For example, when an identity is validated via an iris image obtained with the distance between a lens and an eye set to a short distance of 5 to 15 cm and by a typical signal processing device of which speed is around a few hundred MHz, it is determined that it is sufficient if an image sensor has a resolution of about 640×480 pixels.

In this case, it may be acceptable that the field of vision of the lens is about 15 degrees that corresponds to about two or three times of the size of the pupil.

The range of lighting is preferable when it is slightly wider than the field of vision of the lens while the uniformity of the brightness of lighting should guarantee the image quality to facilitate the iris image processing, or 70 to 80% at least.

Relative uniformities of brightness may be simply compared each other based on the brightness_maximum versus brightness_minimum technique among various methods that have been introduced to determine the uniformity of brightness.

In addition, to achieve effective lighting performance, it is preferred that the lighting range be somewhat wider, by 20 to 50%, than the field of vision of a lens.

When the lighting range is excessively narrow, a variety of additional means are required to achieve the uniformity of brightness in light of the radiation characteristics of an IR LED light source element. When the lighting range is excessively wide, in contrast, relatively intense lighting is required, and thus there arises the disadvantage of power consumption and the number of lighting components both increasing. Because the brightness of lighting is inversely proportional to the square of the illuminated area, four times of the amount of light is required for the same brightness when the lighting range is double.

Figure 1:
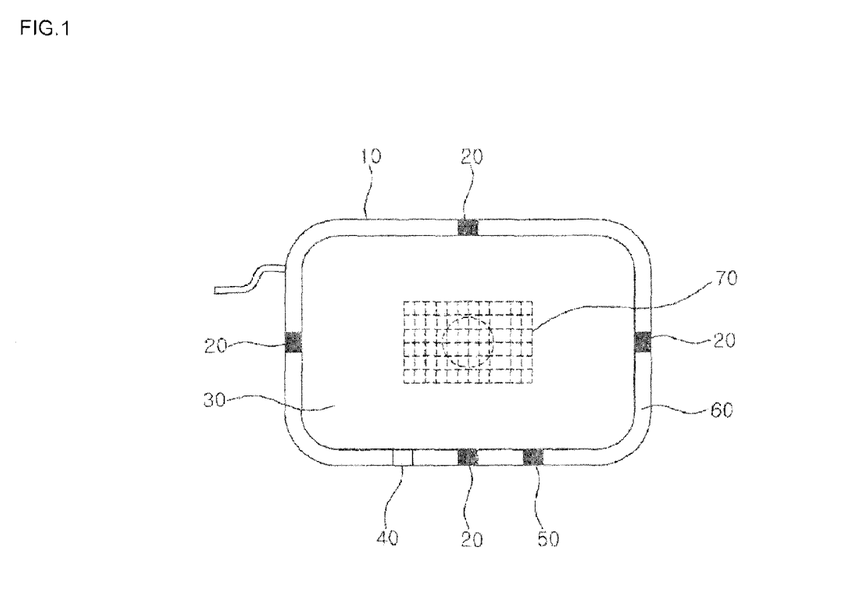
FIG. 1 is a front view of en embodiment of the present invention.
Figure 3:
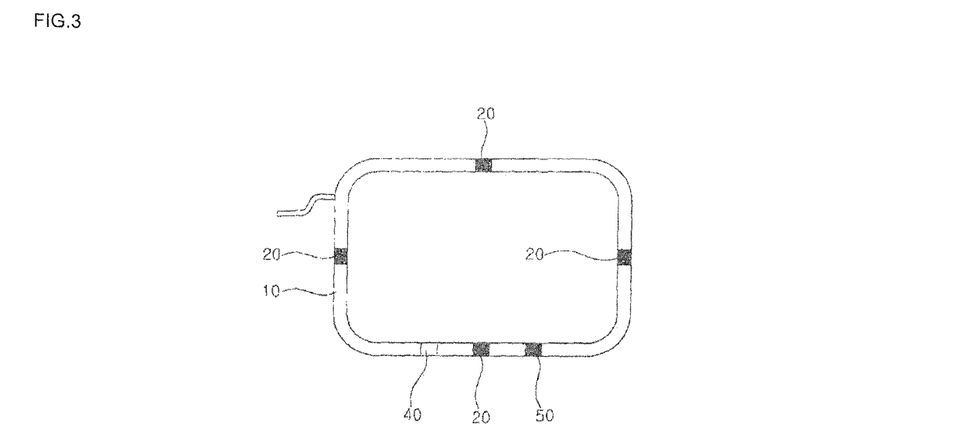
FIG. 3 illustrates an FPCB partially selected from FIG. 1.

As illustrated in FIG. 1 and FIG. 3, an IR LED light source element 20 increases in its power consumption when it is vertically installed in an FPCB 10 because the IR LED light source element 20 requires a larger amount of light since a radiation angle (light angle) has to increase so as to irradiate an adequate amount of illumination around the iris to obtain an image of the iris of an eye that is at a certain distance from the center of a camera 70.

Additionally, there arises a disadvantage in that the IR LED light source element 20 functions as a conductor that transmits external static electricity to internal mechanical devices (not shown) and the uniformity of brightness deteriorates, when used as a short-distance lighting, around the iris.

Figure 2:
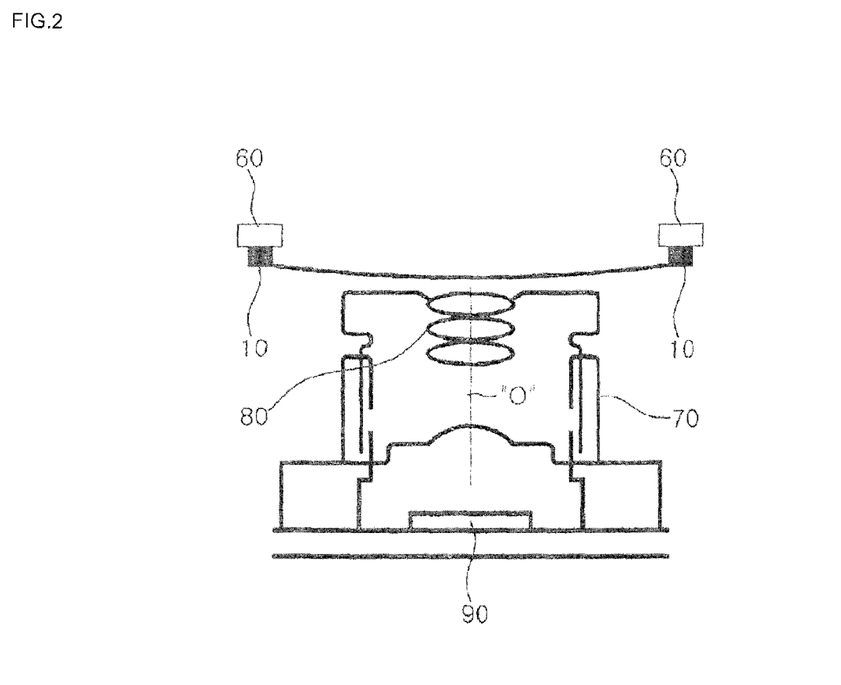
FIG. 2 is a longitudinal cross-sectional view of FIG. 1.
Figure 5:
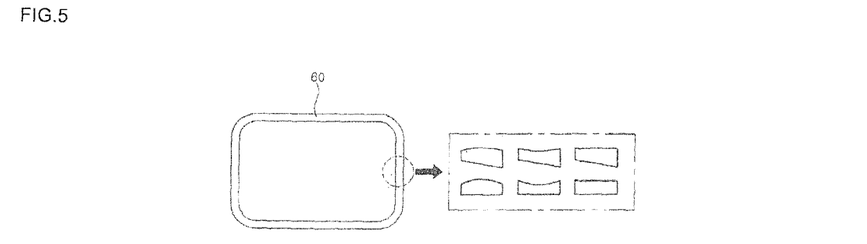
FIG. 5 is a front view of an FPCB cover with cross-sections of a variety of embodiments according to the present invention.

As illustrated in FIG. 2 and FIG. 5, if an LED light source element 20 is not installed in an FPCB 10, an additional support (not shown) should be mounted so as to secure the IR LED light source element 20 and determine and maintain an arbitrary value of the radiation angle, which renders the quality control extremely difficult in mass production because it is difficult to assembly such a geometry and judge a certain angle with naked eye.

Additionally, there arises another disadvantage in that an additional support (not shown) to secure an IR LED light source 20 creates unnecessary space, renders the structure unaesthetic and increases the overall size.

Furthermore, an IR LED light source element 20 installed in the way aforementioned is directly exposed to external environment, similar to that illustrated in FIG. 3, which is vulnerable to external static electricity deteriorating the uniformity of brightness around the iris of an eye.

As illustrated in FIG. 5, an FPCB cover 60 of which upper and lower surfaces are flat may improve the uniformity of brightness around the iris but still pose a problem in optimizing the radiation angle of an IR LED light source 20.

Such an IR LED light source element 20 may employ a metallic guide to dissipate heat because an IR LED light source element 20 consumes a certain amount of electric power to obtain a predetermined amount of light output, which generates heat when it operates.

In such a case, static electricity up to a few thousand volts may be introduced from the human body or air then applied to the FPCB 10 that supplies power and discharged via its internal circuit, which may incur malfunction of the circuit of the internal devices.

Therefore, a static electricity absorption element is generally used as static electricity prevention means. The use of the static electricity absorption element is, however, a factor resulting in an increase in cost. In addition, this method sometimes requires separate measures other than the static electricity absorption element, complicating the structure of a camera module to obtain an iris image and hindering the size of the camera from being minimized, and is not appropriate to be applied to a mobile device.

SUMMARY OF THE INVENTION

Accordingly, the present invention was developed to provide an iris recognition system for a mobile device which is to be embedded in a mobile device that features portability.

More particularly, the present invention is to provide an iris recognition system, in a minimized size (less than 1 cm$^3$), equipped with an camera to obtain an iris image, which may ameliorate the uniformity of brightness in the vicinity of an iris by arranging an IR LED light source element to properly obtain an iris image, prevent static electricity from being discharged into the internal circuit, help the user easily be aware of the image obtaining site and display that iris recognition is being processed for user convenience.

In order to accomplish the objectives aforementioned, there is provided an iris recognition system for a mobile device including an iris image-acquisition camera that is comprising a sensor and its associated circuit, a lens and lighting sources composed of a lighting source element, a displaying light source element and IR LED light source elements, wherein there is a clearance between the lighting source and the center line of the camera while multiple light sources are aligned surrounding the lens, the object plane on which an iris is placed is separated by a certain distance from the end of the lens, practically being the area in the vicinity of the lens center line while the image-forming surface of the lens is an image sensor surface, and the lighting center line is aligned to have an inclined lighting angle corresponding to arctangent D/L with the lens center line so that the lighting center line should be oriented to the object plane of the lens.

Here, the lighting source is disposed in parallel with or approximately in parallel with the lens center line and is equipped with an FPCB cover that protects the lighting source by covering it.

The upper and lower surfaces of the FPCB cover may be required to be corroded (to have minute protrusions and depressions) so as to scatter light or be coated with a material containing a substance that scatters light so that the brightness of the iris surface on which the lighting aforementioned is illuminated may be uniform or even.

In addition, it may be required to form the angle of the incident and emergent planes of the FPCB cover so that it may act as a concave or convex spherical surface or as a prism. To accomplish this, it may also be required to adjust and manufacture in the initial design phase the intensity of the IR LED light source and the irradiation direction of the camera so that they may converge at the focal length.

The present invention has the effects of simplifying a structure by optimizing required conditions for iris image-acquisition, minimizing power consumption for iris image-acquisition, providing an effective lighting means capable of remarkably improving the uniformity of lighting brightness, preventing erroneous operation by static electricity, etc. by shutting off any external interferences and ameliorating user convenience by providing notification of a location at which the iris is accurately captured and the fact that iris recognition is processed.

Additionally, the present invention achieves the effect of minimizing (no less than about 1 cm$^3$) the size of an iris image-acquisition camera so that it may be easily installed in a mobile device such as a smart phone and tablet PC that embeds a DSP.

Furthermore, the present invention has the effect of strengthening personal security in social and financial aspects with the help of biometric technology by providing a user with a high-performance iris recognition system at a low price.

DETAILED DESCRIPTION OF THE INVENTION

The key technological principle of the present invention is to enhance the uniformity of brightness in the vicinity of an iris then improve the iris recognition performance by equipping an IR LED light source element with an inclined surface in its upper and lower side or with an FPCB cover on which protrusions and depressions that diffuse or scatter light, to effectively prevent static electricity being discharged via an IR LED light source element into internal devices, to operate by identifying a real, biological eye and to minimize the size and volume of an iris image-acquiring camera by employing an elliptical mirror optimized as an iris-guiding mirror.

The present invention will now be described more specifically with reference to the following preferred embodiments, examples of which are illustrated in the accompanying drawings.

Any structure or size of a feature of the subject matter may be simplified unless it poses a problem for the description of the present invention.

As illustrated in FIG. 1, an iris recognition camera system for a mobile device according to the invention comprises an FPCB 10 that is composed of an image sensor and its associated circuit (not shown), a camera 70, a displaying light source element 50, a lighting source element 40 and IR LED light source elements 20, an FPCB cover 60 and a guiding mirror 30 that guides a user.

The displaying light source element 50 guides a user's iris to be accurately placed on the object plane of the lens and allows a user to visually notice that iris recognition is being process, which may be an audible method using a sound device or combined method employing both the displaying light source element 50 and sound device.

As illustrated in FIG. 2, the lighting source element 40 is separated by a certain clearance from the center line (O) of the lens 80 of the camera 70 and supports the biometric process that excludes a sham eye of an iris recognition camera system by changing the intensity of light and to deliberately adjust the size of the pupil.

The object plane of the lens 80 on which an iris is placed is separated by a certain distance from the end of the camera 70, practically being the area in the vicinity of the lens center line (O) while the image-forming surface of the lens 80 is an image sensor surface.

The lighting center line is aligned to have an inclined lighting angle corresponding to arctangent D/L with the lens center line (O) of the camera 70 so that the lighting center line should be oriented to the object plane of the lens 80.

Here, the lighting sources 20;40;50 are disposed in parallel with or approximately in parallel with the lens center line (O) of the camera 70 and are equipped with an FPCB cover 60 that was designed and mounted so that the lighting sources may be separated from the lens center line (O) of the camera 70 and emit light to the object plane.

As illustrated in FIG. 3, the IR LED light source elements 20 are configured to emit 2 or more wavelengths of infrared rays, are arranged to surround the circumference of the camera 70. Also, it may be required to analyze an iris image acquired by simultaneously lighting all the IR LED light source elements, diagonally and alternately lighting some of the IR LED light source elements 20 arranged on the four sides of the camera lens 80 or lighting in a predetermined order so as to detect a sham iris including a photograph or video.

Figure 8:
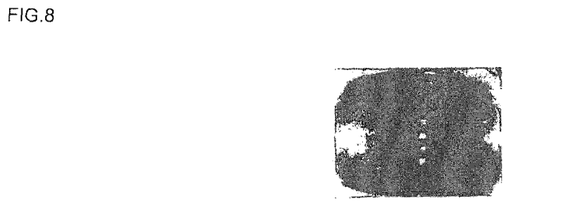
FIG. 8 is a photograph that shows solid patterns on an iris according to an embodiment of the present invention.
Figure 9:
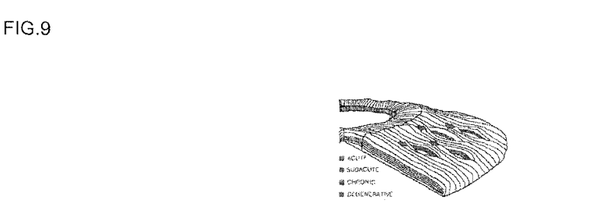
FIG. 9 illustrates patterns that changes depending on the direction of light according to an embodiment of the present invention.

This is because a real iris has solid geometry of which pattern changes depending on the direction of lighting and consequently by the effect of the shadow, as illustrated in FIG. 8 and FIG. 9. A sham iris appeared in a photograph or video, however, doesn't change its pattern regardless of the change in the light direction.

In other words, as illustrated in FIG. 3 and FIG. 9, an iris pattern appears as solid geometry and any size and depth of the solid is not identical to each other. When illuminated to acquired an iris image, the shape of pattern changes based on the light direction and flexion (groove) depth of the iris whereas a sham pattern in a photograph or video doesn't show such a change.

Also changing is the luminance (brightness) of a living eye, depending on the wavelength of an infrared ray irradiated. Therefore, it may be required to install and diagonally and alternately light 2 or more IR LED light source elements 20 that have a different wavelength from each other to facilitate detection of a sham eye.

As illustrated in FIG. 5, the upper and lower surfaces of the FPCB cover 60 may be required to be corroded (to have minute protrusions and depressions) so as to scatter light or be coated with a material containing a substance that scatters light so that the light from the IR LED light source elements 20 may be radiated uniformly.

The cross-sectional shape of the FPCB cover 60 may be designed in a variety of ways, as shown in the expanded view in FIG. 5, to deliberately adjust the radiation angle or irradiation direction of the IR LED light source elements 20.

Figure 10:
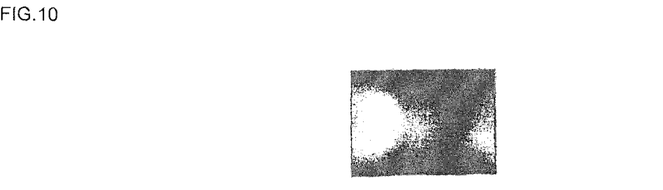
FIG. 10 is a photograph that arrows the uniformity of brightness of a surface directly irradiated by a light emitting element according to an embodiment of the present invention.
Figure 11:
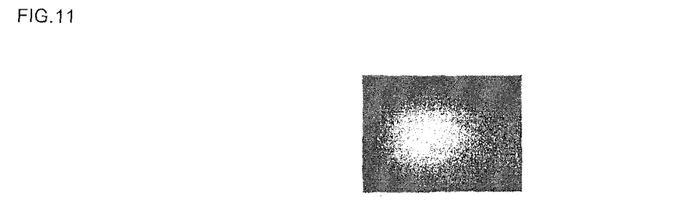
FIG. 11 is a photograph that shows the uniformity of brightness of a surface irradiated by a light emitting element shielded with an FPCB cover.

Such an FPCB cover 60 is configured taking into consideration the tact that the radiation of a typical IR LED light source element 20 is not uniform into which the curvature and geometry of the material such as glass that covers the emitting point and the distance the irradiated rays travel factor. The uniformity of light was significantly enhanced, which is verified when comparing the uniformity of light on the surface that was directly radiated from an IR LED light source element and the uniformity of light on the surface that was radiated from an IR LED light source equipped with an FPCB cover 60, as illustrated in FIG. 10 and FIG. 11.

Figure 6:
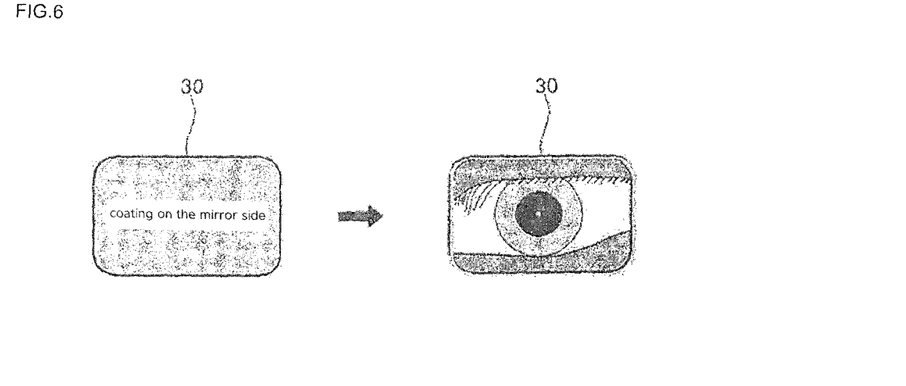
FIG. 6 illustrates a guiding mirror according to an embodiment of the present invention and an example of an iris reflected thereon.

As illustrated in FIG. 6, a guiding mirror 30 is mounted so that a user may look at his or her eye so as to position his or her iris at an optimized place. It is preferred to use a concave mirror, as the guiding mirror, to see a correct image only at a certain distance, but further preferred to use an elliptical mirror to adjust the size of image and to minimize the size of a camera.

The present invention provides relative ease of manufacturing because the IR LED light source element 20 may be vertically assembled exploiting simple fixing tools. The assembly is assessed even with naked eyes in terms of whether it has been completed vertically, which may lead to ease of production quality control.

Furthermore, the present invention prevents erroneous operation by shutting off any external interferences of static electricity, successfully produces a uniform amount of light. In other words, the present invention allows stable acquisition of an iris image based on uniform lighting.

In other application, the direction or radiation angle of light may be designed as preferred by adjusting the cross-section of the FPCB cover 60, as illustrated in FIG. 5, so as to counter the discrepancy between the lens center line and lighting center line.

For iris recognition, a user should accurately position his or her iris on the object plane of the camera 70, which requires an application to measure the definition of an image and inform the user, via voice guide, etc., that his or her iris is in focus so as to encourage the user to accurately position his or her iris on the object plan of the camera 70.

Here, the threshold value of definition measurement fluctuates and is affected by the number of iris patterns, which sometimes leads to recognition failure, when the iris image is not definite even though the application determines it is in focus—in this case, "too many iris patterns."

On the other hand, there are some situations that lead to another recognition failure when the application determines that it is out of focus even though the iris image is definite— in this case, "too few iris patterns." Therefore, it may be not appropriate to assess the definition of an iris image based on the threshold value measured.

In this present invention, to enable a user to place his or her iris accurately on the object plane of the camera 70, primary guidance is provided using the guiding mirror 30, an elliptical mirror, and then secondary guidance is provided to perform acquiring at an accurate location by visually or aurally providing notification that iris recognition is being implemented via a sound device (not shown) or an displaying light source element 50 to a user using a program that determines whether iris recognition can be performed on an image by measuring the size of the iris and contrast, thereby increasing the success rate of iris recognition.

That is, the present invention provides either visually or acoustically a user with information on the definition of an iris, whether it is an image that can be processed and whether it is an iris that meets a predetermined specification, which different from existing methods that determine the accuracy of iris location, irrespective of the iris definition, as per a threshold value that determines only whether it is in focus.

Methods are employed that lead a user to locate his or her iris at a proper position by rendering the user, for example, look at a mirror or detect the iris position using a distance sensor, etc. When using a mirror, the user may see his or her iris image that has been reflected from the mirror located at a certain distance but cannot adjust the size of the reflected image. When using a distance sensor, it is also difficult to guide an iris to an accurate location because the sensor performance is limited in terms of operation speed and other restrictions, which leads to a considerable measurement error within a short distance.

The present invention guides an iris by means of an elliptical mirror so as to locate the iris at an accurate position to acquire an image.

Figure 12:
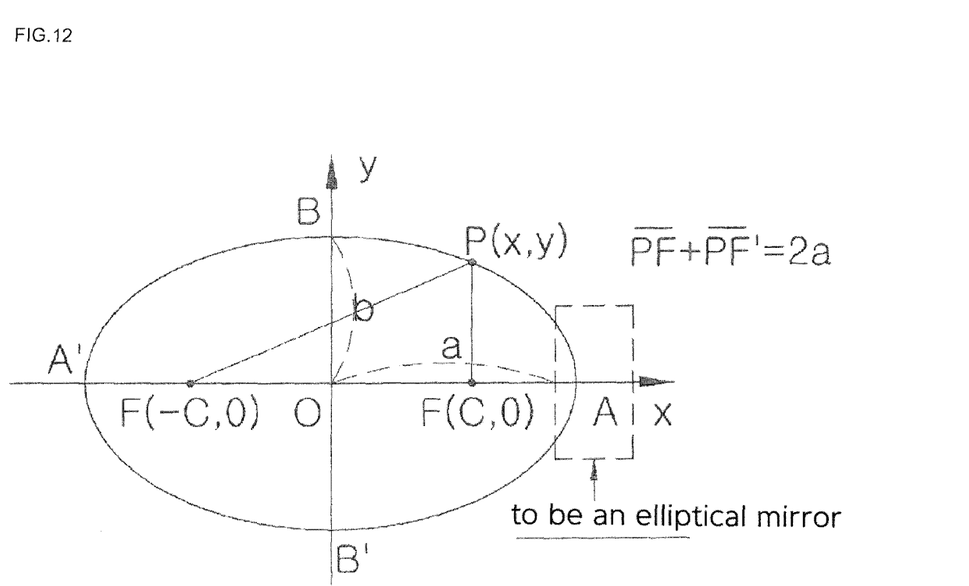
FIG. 12 is an orthogonal coordinate system that expresses an elliptical mirror according to an embodiment of the present invention.

The elliptical mirror may be expressed in an orthogonal coordinate system (with X and Y axes) as follows:

$$x^2/a^2 + y^2/b^2 = 1 (a>b)$$

This may be plotted as illustrated in FIG. 12.

where A=(a,0), B=(0,b), A'=(-a,0), B'=(0,-b) and the distance between the origin and A or A' and B or B' is a and b, respectively.

Here, the set of points P(x,y), the sum of which distances from two foci F(c,0) and F'(-c,0) amounts to 2a, is an ellipse that passes A, B, A' and B'. That is, by adjusting the value of a and b, the shape and focal length (distance between A and F) may also be adjusted. ($b^2=a^2-c^2$ and a,b and c are positive numbers.)

The present invention constructs en elliptical mirror by rotating an ellipse and cuts a part of the elliptical mirror with the point A as its center to use the partial elliptical mirror in guiding an iris. The distance between A, the center of the elliptical mirror, and F, one of the foci of the elliptical mirror, is a-c, the focal length. It is easy to locate an iris at F and it is also easy to find an accurate position because the definition changes very sharply as per the change of the focal length (horizontal movement). Additionally, an iris image of a desired size may be obtained by simply adjusting the values of a and b so as to adjust the size of an iris image that has been reflected from the elliptical mirror with the focal length maintained constant.

In other words, a guiding mirror 30, which was manufactured from an elliptical mirror then has a circular or rectangular shape, is required to be installed at the front end of the camera 70.

Figure 4:
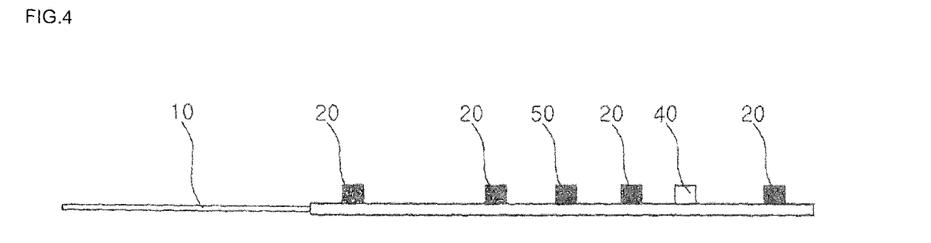
FIG. 4 illustrates light sources arranged on an FPCB in FIG. 3.

As illustrated in FIG. 1, FIG. 3 and FIG. 4, IR LED light source elements 20 are vertically mounted in an FPCB 10 and multiple infrared rays that have wavelengths different from each other and within 750 to 900 nm. Here, the IR LED light source elements 20 are arranged on the four sides of a camera 70 with a certain clearance. The IR LED light source elements 20 may be lighted simultaneously, diagonally and alternately lighted diagonally around a camera lens 80 either from the upper and lower sides or from the left and right sides or lighted in a predetermined order so as to verify whether the subject is a biological eye or sham.

The upper and lower surfaces of an FPCB cover 60 are preferred to be etched (to have fine protrusions and depressions) so as to scatter light or be coated with a material containing a substance that scatters light so that the illumination of the IR LED light source elements 20 may be uniform. The cross-section of the FPCB cover 60 may be manipulated so as to obtain a radiation angle or direction of the lighting that is preferred. Any erroneous operation, by static electricity, of the IR LED light source elements 20 may be prevented by shutting off external interferences. Furthermore, it is simple to assemble and manufacture an iris recognition camera system according to the present invention, which raises productivity and maintains good quality.

A guiding mirror 30 illustrated in FIG. 6 is manufactured from an elliptical mirror of which curvature is larger than that of a concave mirror so as to decrease the size of an iris image that is reflected on the guiding mirror 30 when seen from a constant distance. Therefore, a small volume (less than 1 cm³) of a camera may be materialized by reducing the size of the guiding mirror 30 so as to embed it in a mobile device.

If a conventional camera is employed of which size has been reduced, it is difficult for a user to acquire an image of his or her iris. On the other hand, if a distance sensor or guiding mirror is additionally employed, it becomes almost impossible to apply it to a mobile device such as a mobile phone because the size of the camera increases.

The present invention can allow a user to conveniently acquire an image of his or her iris while watching it and expand the applicability in mobile devices including smart phones and tablet PCs that are widely used currently, by embedding an iris recognition camera system, the size and volume of which can be minimized, in those mobile devices with reduced costs.

The invention claimed is:

1. An iris recognition camera system for mobile device comprising a sensor and associated circuit, a camera lens and lighting sources including a lighting source element, a displaying light source element and IR LED light source elements, wherein the lighting sources are installed around the center of the camera lens with a predetermined clearance, and the lighting sources are attached on an FPCB and arranged on the four sides of the center of the camera lens and equipped with an FPCB cover for protection and a guiding mirror configured for acquisition by a user of an image of his or her iris watching the image of his or her iris thereby to determine that the iris is a living iris.

2. The iris recognition camera system for mobile device of claim 1, wherein, for a primary measure, the IR LED light source elements are arranged on the four sides of the camera lens and lighted simultaneously, diagonally and alternately lighted either from the upper and lower sides or from the left and right sides or lighted in a predetermined order which verifies the iris pattern and determines whether the iris is sham, then, for a secondary measure, the wavelength of infrared rays equal to or more than 800 nm is selected so as to strengthen sham iris detection performance.

3. The iris recognition camera system for mobile device of claim 1, wherein the upper surface, the lower surface or both of the upper and lower surfaces of the FPCB cover is etched to have fine protrusions and depressions that are configured to scatter or diffuse light or be coated or formed with a material containing a substance that scatters or diffuses light.

4. The iris recognition camera system for mobile device of claim 1, wherein a cross section of the FPCB cover is configured so that the upper and/or lower surface act as a concave spherical surface and convex spherical surface or a convex spherical and concave spherical surface, respectively, or act as a prism so as for the radiation angle of lighting by the lighting sources to intersect with the principal axis of the camera at the focal length.

5. The iris recognition camera system for mobile device of claim 1, wherein the guiding mirror is an elliptical mirror and the elliptical mirror is coated with a substance that reflects visible rays and transmits infrared rays.

6. The iris recognition camera system for mobile device of claim 3, wherein a cross section of the FPCB cover is configured so that the upper and/or lower surface act as a concave spherical surface and convex spherical surface or a convex spherical and concave spherical surface, respectively, or act as a prism so as for the radiation angle of lighting by the lighting sources to intersect with the principal axis of the camera at the focal length.

7. An iris recognition camera system for mobile device, comprising comprising a sensor and associated circuit, a camera lens and lighting sources including a lighting source element, a displaying light source element and IR LED light source elements wherein, for primary measure, the IR LED light source elements are installed around the center of the camera lens with a predetermined clearance and are configured to be lighted simultaneously, diagonally and alternately lighted either from the upper and lower sides or from the left and right sides or lighted in a predetermined order which verifies the iris pattern and determines whether the iris is sham, and, for secondary measure, the wavelength of infrared rays equal to or more than 800 nm is selected so as to strengthen sham iris detection performance and the lighting sources are attached on an FPCB and arranged on the four sides of the center of the camera lens and equipped with an FPCB cover for protection wherein at least one of an upper surface and a lower surface of the FPCB cover is etched to have fine protrusions and depressions configured to scatter or diffuse light or is coated or formed with a material containing a substance that scatters or diffuses light and a cross section of the FPCB cover is configured so that at least one of the upper and lower surface acts as a concave spherical surface and convex spherical surface or a convex spherical and concave spherical surface, respectively, or acts as a prism so as for the radiation angle of lighting by the lighting sources to intersect with the principal axis of the camera at the focal length, and further comprising an elliptical guiding mirror coated with a substance that reflects visible rays and transmits infrared rays and is configured for acquisition by a user of an image of his or her iris watching the image of his or her iris thereby to determine that the iris is a living iris.

* * * * *